United States Patent [19]

Hackert

[11] Patent Number: 4,821,679
[45] Date of Patent: Apr. 18, 1989

[54] PORTABLE CORRAL ASSEMBLY AND METHOD FOR TRANSPORTING SAME

[76] Inventor: Kenneth Hackert, Rte. 1, Sully, Iowa 50251

[21] Appl. No.: 123,768

[22] Filed: Nov. 23, 1987

[51] Int. Cl.4 .............................................. A01K 3/00
[52] U.S. Cl. ..................................................... 119/20
[58] Field of Search ............... 119/20, 155; 254/10 R; 414/608, 680

[56] References Cited

U.S. PATENT DOCUMENTS

| | | | |
|---|---|---|---|
| 2,524,048 | 10/1950 | Furnas | 119/20 |
| 2,730,252 | 1/1956 | Oswalt | 414/680 X |
| 2,736,442 | 2/1956 | Westholt | 119/20 |
| 3,921,585 | 11/1975 | Hall | 119/20 |
| 4,537,151 | 8/1985 | Bolton | 119/20 |

*Primary Examiner*—Robert P. Swiatek
*Attorney, Agent, or Firm*—Zarley McKee, Thomte, Voorhees & Sease

[57] ABSTRACT

The portable corral assembly of the present invention comprises a gate having connectors on its opposite ends for connection to two adjacent corral members. The corral members are fastened in end-to-end relationship into an enclosed corral. The gate ncludes a bracket assembly adapted to receive either the three point hitch of a tractor or the lifting arms of an end loader. Carrying pins are mounted on the upper edge of the gate member and are adapted to receive each of the corral members. The method involves detachably securing a three point hitch or an end loader to the gate and mounting all of the various corral members on the carrying pins of the gate. The gate and the corral members can be transported to a new location for reassembly into a new corral.

6 Claims, 2 Drawing Sheets

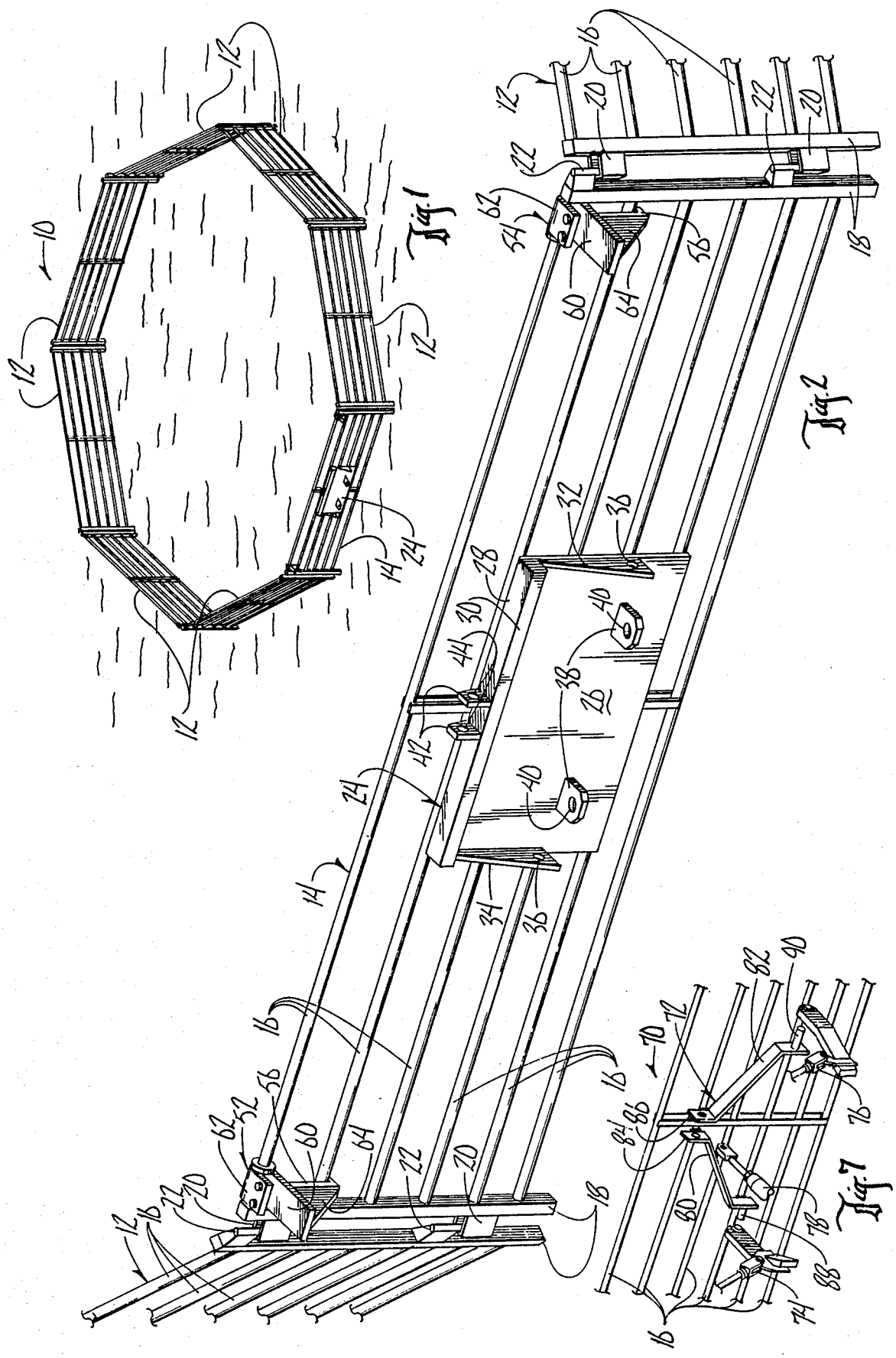

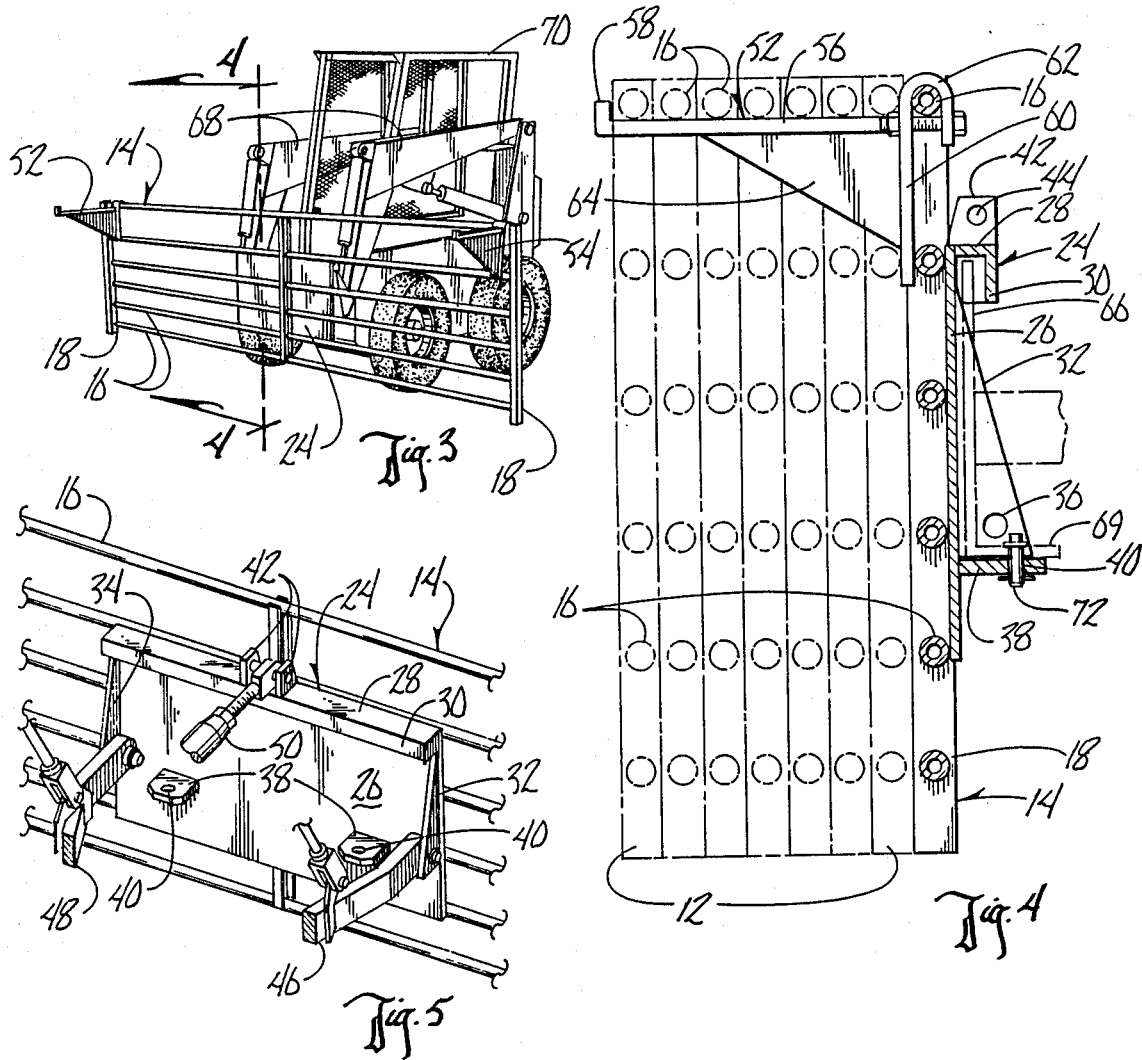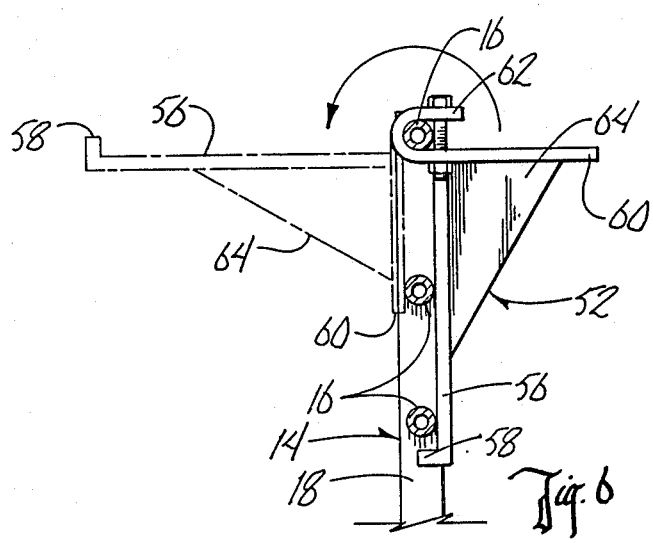

PORTABLE CORRAL ASSEMBLY AND METHOD FOR TRANSPORTING SAME

BACKGROUND OF THE INVENTION

This invention relates to a portable corral assembly and method for transporting same.

Portable corrals have been utilized and usually are comprised of a plurality of corral members or gate members which are fastened in end-to-end relationship to form an enclosed corral. These corral members and gate members are often heavy, and transporting them is a difficult and cumbersome task.

Therefore, a primary object of the present invention is the provision of an improved portable corral assembly and method for transporting same.

A further object of the present invention is the provision of a corral assembly which can be quickly and easily mounted to the three point hitch of a tractor or to the lifting arms of an end loader for transporting.

A further object of the present invention is the provision of a portable corral assembly and method for transporting same which is simple and economical in construction and easy to use.

SUMMARY OF THE INVENTION

The portable corral assembly of the present invention includes a plurality of corral members which are adapted to be secured to one another in end-to-end relationship for forming an enclosed corral. One of these corral members forms a gate and includes a lifting bracket on one of its faces. The lifting bracket is adapted to receive the three point hitch of a tractor and is also adapted to receive the lifting arms of an end loader. Mounted to the upper edge of the gate member at opposite ends thereof are a pair of carrying pins which extend perpendicularly horizontally from the upper edge of the gate. The remaining corral members may be hung from these carrying pins so that the entire corral can be transported quickly and easily as a unit.

Either an end loader or a three point tractor can be detachably secured to the lifting bracket of the gate member. The gate member and the corral members which are suspended on the lifting pins of the gate member can then be transported to a new location.

BRIEF DESCRIPTION OF THE DRAWINGS

FIG. 1 is a perspective view of the corral assembly of the present invention.

FIG. 2 is an enlarged perspective view of the gate member of the present invention.

FIG. 3 is a perspective view of an end loader which is shown carrying the gate member of the present invention.

FIG. 4 is an enlarged sectional view taken along line 4—4 of FIG. 3.

FIG. 5 is a perspective view of the lifting bracket, showing the three point hitch of a tractor detachably secured thereto.

FIG. 6 is an enlarged sectional view showing the carrying pins at the upper edge of the gate.

FIG. 7 is a partial perspective view of a modified form of the present invention.

DETAILED DESCRIPTION OF THE PREFERRED EMBODIMENT

The numeral 10 generally refers to the corral assembly of the present invention. Corral assembly 10 comprises a plurality of corral members or sections 12 and one gate member or section 14. Each corral section 12 includes a plurality of horizontally extending vertically spaced bars 16 having vertical bars 18 at the opposite ends thereof. Gate member 14 also has similar horizontal bars 16 and vertical end bars 18. At the left end of each corral member 12 and gate member 14 are a pair of vertically aligned receptacles 20 and at the right hand end of each corral member 12 and gate member 14 are a pair of downwardly extending pins 22 which are adapted to fit within receptacles 20 so as to secure the corral members and gate member in end-to-end relationship to form the enclosed corral shown in FIG. 1.

While gate member 14 is shown in the drawings to include pins 22 at one end thereof and receptacles 20 at the opposite end thereof, it is also possible to use pins 22 and receptacles 20 in different arrangements. For example, gate member 14 may include receptacles 20 at both ends or may alternatively include pins 22 at both ends.

Mounted on the outside face of gate member 14 is a lifting bracket designated generally by the numeral 24. Bracket 24 comprises a vertical backing plate 26 which is welded or otherwise fixed to the exterior surface of gate member 14. Extending outwardly from the upper edge of backing plate 26 is a horizontal flange 28 which has a downwardly extending lip flange 30 at its outer edge. A pair of triangular gussets 32, 34 are attached to the opposite ends of backing plate 26 and include a pair of horizontal pin receiving holes 36 therein. Welded to the exterior face of backing plate 26 are a pair of horizontal lugs 38 which have vertical pin receiving holes 40 therein.

Mounted to the upper surface of horizontal flange 28 are a pair of ear flanges 42 which have registered horizontal pin receiving holes 44 therein.

Ear flanges 42 and gusset flanges 32, 34 provide means for receiving the three arms of a three point hitch of a conventional tractor as shown in FIG. 5. The three arms 46, 48, 50 are detachably secured to gusset flanges 32, 34 and ear flanges 44, respectively, as shown in FIG. 5. This permits the gate member 14 to be lifted by the three point hitch of a tractor (not shown) and transported to a desired location.

Gate member 14 also includes a pair of carrying pins 52, 54 which are mounted to the uppermost bar 16 of gate member 14. As shown in FIG. 6, each carrying pin includes an elongated pin 56 having an upwardly extending lip 58 at its outer end. Extending perpendicularly to elongated pin 56 is a stop plate 60 having a J-shaped portion 62 wrapped around the uppermost bar 16 so as to provide hinged attachment thereto. A gusset plate 64 extends between elongated pin 56 and backing plate 60 to provide rigid reinforcement therebetween.

The carrying pin 52 is pivotal from the inoperative position shown in solid lines in FIG. 6 of the drawings to the operative position shown in shadow lines in FIG. 6. When in its operative position, carrying pin 52 is adapted to receive all of the various corral members 12 in the manner shown in FIG. 4. The various corral members are suspended from the two carrying pins 52 and are in face-to-face relation with one another. In this position (FIG. 4), the lower end of stop plate 60 engages the second highest horizontal bar 16 of gate member 14 so as to limit the clockwise pivoting of carrying pin 52.

When the corral is assembled as shown in FIG. 1, the carrying pins 52 are pivoted to their inoperative position shown in solid lines in FIG. 6 so as to remove any inwardly extending projections from the corral which has been assembled.

The device of the present invention is also adapted to be carried by an end loader as is shown in FIGS. 3 and 4. The end loader includes a vertically extending plate 66 at the outer ends of its lift arms 68. The upper edge of the vertical plate 66 is adapted to nest within the receptacle provided by horizontal flange 28 and lip flange 30 of lifting bracket 24. At the lower end of vertical plate 66 is a horizontal flange 69 having a pair of holes adapted to align with and be secured to the pin receiving holes 40 within lugs 38 as shown in FIG. 4. Conventional pins 72 can be used for this purpose. This permits the lifting arm 68 of the front end loader 70 to lift the gate member 14 and transport it to the new desired location.

FIG. 7 shows a modified form of the invention utilizing a gate frame 70 which is the same as gate frame 14, except that it includes a hitch assembly 72 adapted for the three points 74, 76, 78 of a tractor's three point hitch. Hitch assembly 72 comprises a pair of angle members 80, 82 which are welded or otherwise attached to the horizontal bars 16 of gate frame 70. The upper ends of angle members 80, 82 are formed into spaced apart ears 84, 86 adapted to be quick attached to member 78 of a tractor three point hitch. The lower ends of angle members 80, 82 are provided with pins 88, 90 adapted to be quick attached to arms 74, 76 of a tractor three point hitch.

The device is very simple to use and easy to transport to different locations by using conventional farm equipment such as tractors and end loaders.

Thus, it can be seen that the device accomplishes at least all of its stated objectives.

What is claimed is:

1. A portable corral assembly comprising:
   a plurality of elongated corral members detachably secured together in end-to-end relation with one another to form an enclosed corral, one of said corral members forming a gate member;
   said gate member having an upper edge, a lower edge, opposite end edges, a front face, and a rear face;
   connecting means on said opposite ends of said gate member for connection to two adjacent ones of said portable corral members;
   a carrying bracket assembly mounted on said front face of said gate member, said bracket assembly comprising a vertical flat plate attached to said front face of said gate member, a horizontal flange attached to said vertical plate and extending horizontally away from said gate member, and a lip flange extending downwardly from said horizontal flange in spaced relation to said vertical plate member;
   said carrying bracket assembly having a pair of horizontally spaced apart lug members attached to said vertical plate in spaced relation below said horizontal flange, said lug members each having vertical pin receiving holes extending downwardly therethrough.

2. A corral assembly according to claim 1 wherein said bracket assembly further comprises a three point hitch mechanism which includes a pair of horizontally spaced apart gusset flanges attached to said vertical flat plate, each of said gusset flanges having a horizontal pin receiving hole extending therethrough, a pair of ear flanges mounted to said horizontal flange approximately equidistant from said lug flanges, said ear flanges having horizontal pin receiving holes extending therethrough.

3. A corral assembly according to claim 1 wherein a pair of horizontally spaced apart carrying pins are attached to said gate member adjacent said upper edge thereof, said carrying pins extending horizontally away from said gate member in a direction opposite from said horizontal flange of said bracket assembly, said carrying pins terminating in upwardly turned tips.

4. A corral assembly according to claim 3 wherein said carrying pins are pivotally attached to said gate member for hinged movement about a horizontal axis.

5. A method for transporting a portable corral comprising: a plurality of elongated corral members detachably secured together in end-to-end relation with one another to form an enclosed corral, one of said corral members forming a gate member; said gate member having an upper edge, a lower edge, opposite end edges, a front face, and a rear face; connecting means on said opposite ends of said gate member for connection to two adjacent ones of said portable corral members; a carrying bracket assembly mounted on said front face of said gate member, said gate member having, a pair of horizontally spaced apart carrying pins attached to said gate member adjacent said upper edge thereof, said carrying pins extending horizontally away from said gate member in a direction opposite from said bracket assembly, said carrying pins terminating in upwardly turned tips, said method comprising:
   inserting distal ends of lifting arms of an end loader into retentive engagement with said bracket assembly:
   detachably securing said distal ends of said lifting arms to said bracket assembly;
   lifting said lifting arms to lift said gate member; hanging said corral members on said carrying pins of said gate member;
   transporting said gate member with said corral members hanging on said carrying pins to a new location.

6. A method for transporting a portable corral comprising: a plurality of elongated corral members detachably secured together in end-to-end relation wit one another to form an enclosed corral, one of said corral members forming a gate member; said gate member having an upper edge, a lower edge, opposite end edges, a front face, and a rear face; connecting means on said opposite ends of said gate member for connection to two adjacent ones of said portable corral members; a carrying bracket assembly mounted on said front face of said gate member, said gate member having a pair of horizontally spaced apart carrying pins attached to said gate member adjacent said upper edge thereof, said carrying pins extending horizontally away from said gate member in a direction opposite from said bracket assembly, said carrying pins terminating in upwardly turned tips; said method comprising:
   attaching two side arms of a three point hitch of a tractor to said bracket assembly;
   attaching the third arm of said three point hitch to said bracket assembly;
   hanging said corral members on said carrying pins of said gate member;
   using said tractor to lift said three point hitch and said gate member having said corral members hanging thereon;
   transporting said gate member and said corral members to a new location by driving said tractor to said new location.

* * * * *